(12) United States Patent
Komatsu et al.

(10) Patent No.: US 9,649,852 B2
(45) Date of Patent: May 16, 2017

(54) INK JET RECORDING METHOD, INK SET, AND RECORDED MATTER

(75) Inventors: Hidehiko Komatsu, Chino (JP); Tetsuya Aoyama, Shiojiri (JP); Ippei Okuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

(21) Appl. No.: 13/207,493

(22) Filed: Aug. 11, 2011

(65) Prior Publication Data

US 2012/0040155 A1 Feb. 16, 2012

(30) Foreign Application Priority Data

Aug. 11, 2010 (JP) ................. 2010-180113

(51) Int. Cl.
| | |
|---|---|
| B41M 3/00 | (2006.01) |
| B41J 2/015 | (2006.01) |
| C09D 11/02 | (2014.01) |
| C09D 11/322 | (2014.01) |
| C09D 11/40 | (2014.01) |
| C09D 11/54 | (2014.01) |
| B32B 3/10 | (2006.01) |
| B41J 2/21 | (2006.01) |
| B41M 5/00 | (2006.01) |

(52) U.S. Cl.
CPC ............ *B41J 2/2114* (2013.01); *B41M 3/008* (2013.01); *C09D 11/322* (2013.01); *C09D 11/40* (2013.01); *C09D 11/54* (2013.01); *B32B 3/10* (2013.01); *B41M 5/0011* (2013.01); *B41M 5/0023* (2013.01); *Y10T 428/24851* (2015.01); *Y10T 428/24876* (2015.01)

(58) Field of Classification Search
CPC ........ B41J 2/2114; C09D 11/40; C09D 11/54; Y10T 428/24802
See application file for complete search history.

(56) References Cited

U.S. PATENT DOCUMENTS

| | | | |
|---|---|---|---|
| 4,680,058 A | 7/1987 | Shimizu et al. | |
| 4,880,465 A | 11/1989 | Loria et al. | |
| 6,221,326 B1 | 4/2001 | Amiche | |

(Continued)

FOREIGN PATENT DOCUMENTS

| | | | | |
|---|---|---|---|---|
| EP | 2053099 A1 | * | 4/2009 | ............ B41J 2/2114 |
| JP | 59-041370 A | | 3/1984 | |

(Continued)

OTHER PUBLICATIONS http://mintaka.sdsu.edu/GF/explain/optics/color/intro.html (Obtained Mar. 14, 2014).*
Machine Translation of Jp 2009-269397.*

*Primary Examiner* — Gerard Higgins
*Assistant Examiner* — Sathavaram I Reddy
(74) *Attorney, Agent, or Firm* — Nutter McClennen & Fish LLP; John J. Penny, Jr.; Joshua L. Rudawitz (57) ABSTRACT

The ink jet recording method is an ink jet recording method used in a recording apparatus including a white ink containing a white color material, a resin ink containing a resin, and a glitter ink containing a glitter pigment, and a head for recording using the white ink, the resin ink, and the glitter ink, the method including firstly forming a white ink layer on a recording medium, secondly forming a resin ink layer on the white ink layer, and thirdly forming the glitter ink layer on the white ink layer.

8 Claims, 1 Drawing Sheet

(56) References Cited

U.S. PATENT DOCUMENTS

| | | |
|---|---|---|
| 7,303,619 B2 | 12/2007 | Oyanagi |
| 7,513,945 B2 | 4/2009 | Nakano et al. |
| 7,604,693 B2 | 10/2009 | Oyanagi et al. |
| 7,763,108 B2 | 7/2010 | Oyanagi et al. |
| 8,328,340 B2 | 12/2012 | Ogawa et al. |
| 2004/0032473 A1* | 2/2004 | Ishimoto ............ B41J 2/2114 347/100 |
| 2006/0189712 A1* | 8/2006 | Kondo ............ 523/160 |
| 2007/0032571 A1* | 2/2007 | Furuno et al. ............ 523/160 |
| 2008/0165237 A1* | 7/2008 | Yamauchi ............ B41J 11/002 347/102 |
| 2008/0213518 A1 | 9/2008 | Oyanagi et al. |
| 2009/0208651 A1 | 8/2009 | Oyanagi et al. |
| 2009/0220695 A1* | 9/2009 | Oyanagi et al. ............ 427/256 |
| 2010/0026743 A1* | 2/2010 | Van Thillo et al. ............ 347/9 |
| 2010/0047455 A1* | 2/2010 | Hoogmartens ............ 427/258 |
| 2010/0143593 A1 | 6/2010 | Sano |
| 2010/0209677 A1 | 8/2010 | Sano et al. |

FOREIGN PATENT DOCUMENTS

| | | |
|---|---|---|
| JP | 2000500113 A | 1/2000 |
| JP | 2000239585 A | 9/2000 |
| JP | 200568250 A | 3/2005 |
| JP | 200716103 A | 1/2007 |
| JP | 2008174712 A | 7/2008 |
| JP | 2008208332 A | 9/2008 |
| JP | 2008-239951 A | 10/2008 |
| JP | 2008-294308 A | 12/2008 |
| JP | 2009-030014 A | 2/2009 |
| JP | 2009234854 A | 10/2009 |
| JP | 2009-269397 A | 11/2009 |
| JP | 2009256565 A | 11/2009 |
| JP | 2010-158887 A | 7/2010 |
| JP | 2010158884 A | 7/2010 |

\* cited by examiner

INK JET RECORDING METHOD, INK SET, AND RECORDED MATTER

Priority is claimed under 35 U.S.C. §119 to Japanese Application No. 2010-180113 filed on Aug. 11, 2010 which is hereby incorporated by reference in its entirety.

BACKGROUND

1. Technical Field

The present invention relates to an ink jet recording method, an ink set, and recorded matter.

2. Related Art

Recently, there has been an increasing demand for recorded matter in which an image having glitter is formed on a recording surface. As for a method for forming an image having glitter, for example, a foil-pressing and recording method in which a recording medium having high recording surface flatness is prepared, to which a metal foil is pressed and adhered for recording, a method in which a metal or the like is vapor-deposited on a plastic film having a smooth recording surface, and a method in which a glitter pigment ink is coated onto a recording medium to perform a press process have been carried out for recording in the related art. However, these methods have a problem that it is difficult to form an image desired by users, and therefore, a technique which enables recording of a glitter image in an ink jet mode has been proposed (for example, JP-A-2009-256565).

On the other hand, when an ink having a glitter pigment (hereinafter appropriately referred to as a glitter ink) is recorded on a transparent recording medium, represented by PET or the like, in an ink jet mode, a hiding ability may be insufficient only with the glitter pigment in some cases, and thus, there has been a problem that a good image cannot be formed. With respect to the problem, the use of a white ink having a high hiding ability as an underlayer forming ink has been proposed in the related art (for example, JP-A-2010-158884).

However, in the case where a white ink layer is recorded on a recording medium and then a glitter ink layer is recorded thereon in order to exhibit a hiding property, there has been a problem that the glitter of the glitter ink is much reduced. As such, in the related art, it is impossible to obtain recorded matter having both glitter and a hiding property.

SUMMARY

As described above, an advantage of some aspects of the invention is to record an image having good glitter and a good hiding property on a recording medium. The means for gaining the advantage is as follows.

Application 1

An ink jet recording method used in a recording apparatus including a white ink containing a white color material, a resin ink containing a resin, and a glitter ink containing a glitter pigment, and a head for recording using the white ink, the resin ink, and the glitter ink, the method including firstly forming a white ink layer on a recording medium, secondly forming a resin ink layer on the white ink layer, and thirdly forming the glitter ink layer on the white ink layer.

Thus, it becomes possible to alleviate or eliminate the unevenness of a white color material surface by resin ink, and accordingly, the glitter ink layer can exhibit high glitter while having a hiding property.

Application 2

The ink jet recording method as described in Application 1, wherein the volume average diameter (Mv) of the white ink is 100 nm or more and 700 nm or less.

Thus, it is possible to alleviate or eliminate the unevenness of the white color material surface by the resin ink, and thus, it is possible for the glitter ink layer to have high glitter while having a hiding property.

Application 3

The ink jet recording method as described in Application 1 or 2, wherein the surface roughness of the surface layer of the resin ink layer is 20 µm or less.

Thus, the resin ink layer has good smoothness and the glitter ink is aligned smoothly, which makes it possible to exhibit good glitter.

Application 4

The ink jet recording method as described in any one of Applications 1 to 3, wherein the second formation includes drying the resin ink layer.

By including drying, the shape of a good and smooth surface can be maintained, which makes it possible to obtain a preferable glitter.

Application 5

The ink jet recording method as described in any one of Applications 1 to 4, wherein the recording medium is a transparent recording medium.

The transparent recording medium, on which much white ink is recorded, is required to have a high hiding property, which however makes it possible to form a layer exhibiting good glitter.

Application 6

The ink jet recording method as described in any one of Applications 1 to 5, wherein the white color material is titanium dioxide and the volume average diameter (Mv) of the titanium dioxide is 280 nm or more and 440 nm or less.

Thus, recorded matter having a high hiding property and glitter can be obtained.

Application 7

An ink set including the white ink, the resin ink, and the glitter ink, which is used in the ink jet recording method as described in any one of Applications 1 to 6.

Thus, recorded matter having a high hiding property and glitter can be obtained.

Application 8

Recorded matter recorded by the ink jet recording method as described in any one of Applications 1 to 6.

Thus, recorded matter having a high hiding property and glitter can be obtained.

BRIEF DESCRIPTION OF THE DRAWINGS

The invention will be described with reference to the accompanying drawings, wherein like numbers reference like elements.

Figure 1:
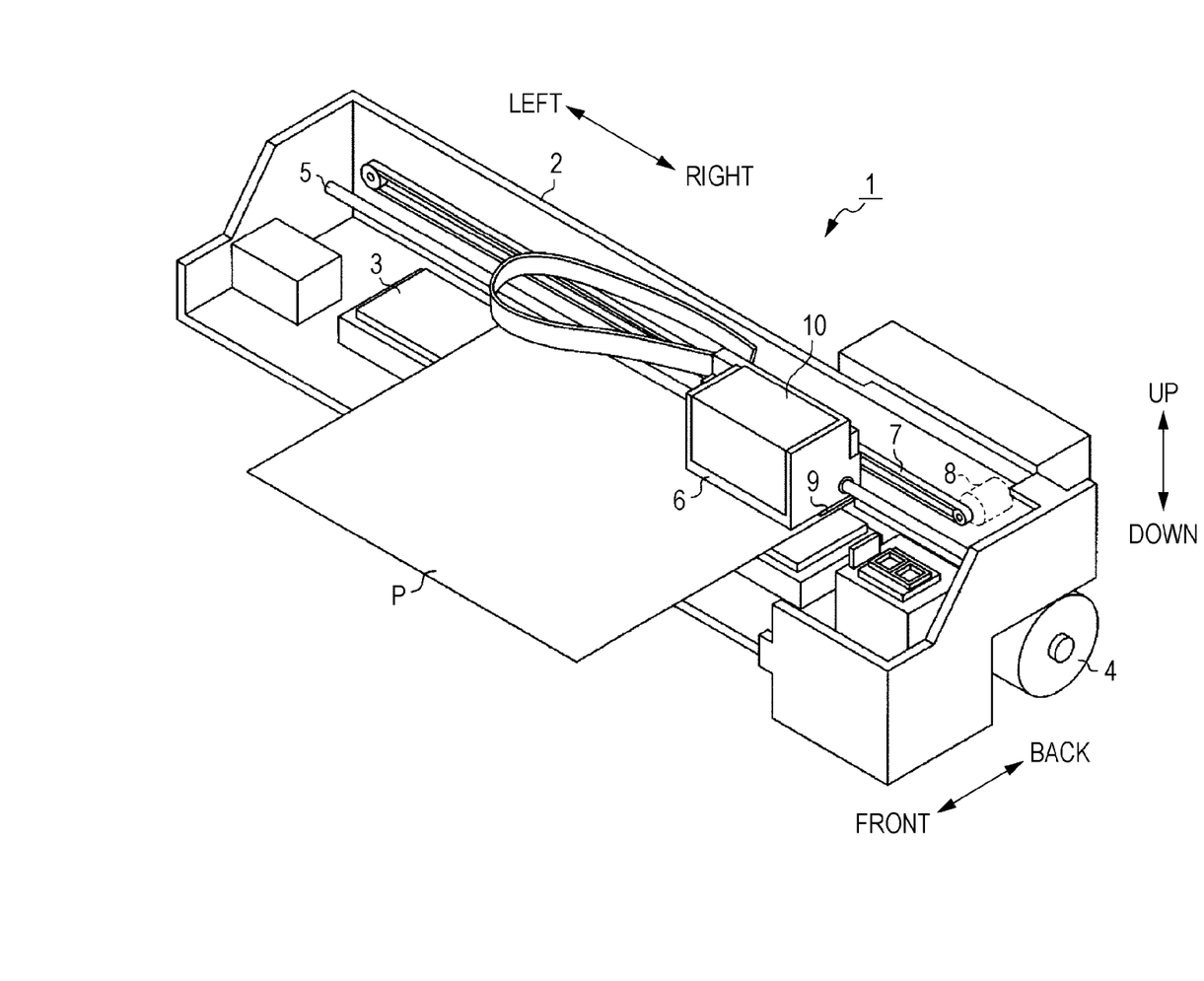
FIGURE is a perspective view showing the schematic structure of the ink jet apparatus.

DESCRIPTION OF EXEMPLARY EMBODIMENTS 1.1. Ink Jet Recording Apparatus

Hereinbelow, one embodiment of the invention will be explained by way of an example in which an ink jet printer is used as a recording apparatus with reference to the drawings.

As shown in FIGURE, an ink jet type printer 1 (hereinafter referred to as a printer 1) as a recording apparatus has a frame 2. In the frame 2, a platen 3 is provided, in which paper P is fed to the platen 3 by a recording medium feed motor 4. Further, in the frame 2, a rod-shaped guide member 5 is provided in parallel to the longitudinal direction of the platen 3.

In the guide member 5, a carriage 6 is supported so as to reciprocate in the axial direction of the guide member 5. The carriage 6 is connected to a carriage motor 8 via a timing belt 7 provided in the frame 2. Further, the carriage 6 is moved so as to reciprocate along the guide member 5 by the driving of the carriage motor 8.

A head 9 is provided in the carriage 6 and also an ink cartridge 10 for feeding the ink as a liquid to the head 9 is detachably disposed. The ink in the ink cartridge 10 is fed from the ink cartridge 10 to the head 9 by the driving of a piezoelectric element provided in the head 9 (not shown), and thus discharged to a recording medium P fed onto the platen 3 from plural nozzles formed on the nozzle forming surface of the head 9. Thus, it becomes possible to prepare recorded matter.

The recording method may be a thermal ink jet (BUBBLEJET (registered trade mark)) system. Further, any of known methods in the related art may be used.

1.2. Ink Jet Recording Method 1.2.1. Step of Forming White Ink Layer

The present embodiment involves forming a white ink layer on a recording medium using a white ink (hereinafter appropriately referred to as a first process). The recording medium is not particularly limited, but it may be a white recording medium or another color of recording media such as a black recording medium and the like. Further, in the case of a transparent recording medium, in particular, the invention particularly exerts an effect. The transparent recording medium itself has a high transmission rate, and thus, even when recording is carried out thereon using ink, there are cases in which the ink itself becomes transparent and a desired image cannot be obtained. On the other hand, there is an advantage that hiding power is exerted by forming a white ink layer and it is easy to carry out recording of a desired image since the color of the white ink is close to that of plain paper or photo paper that has been used in the related art. There is a problem that the white ink layer provides a high hiding power, but unevenness occurs on the surface layer in some case.

Here, the "transparent recording medium" is not limited to a completely transparent recording medium having a visible light transmission rate of 100%, but also includes transparent recording media, in which as seen in one direction, the opposite side (in the opposite direction) of the transparent recording media can also be seen through the recording media; so-called, semi-transparent media.

Moreover, the "white ink" refers to ink in which the lightness (L*) and the chromaticity (a* and b*) of ink discharged on EPSON genuine photo paper <Glossy> (manufactured by Seiko Epson Corporation) at a duty of at least 100% exhibits a range of 70≤L*≤100, −4.5≤a*≤2, and −6≤b*≤2.5 by setting a spectrophotometer, Spectrolino (trade name: manufactured by GretagMacbeth AG) under the measurement conditions of a D50 light source and an observation view of 2° with an intensity of DIN_NB, a white base of Abs, a filter of No, and a measurement mode of Reflectance, and performing the measurement.

Furthermore, the "duty" is also referred to as a recording intensity and indicates a value calculated by the following equation:

Duty (%)=Actual number of recorded dots/(Vertical resolution×Horizontal resolution)×100

(wherein the "actual number of recorded dots" is an actual number of recorded dots per unit area, and the "vertical resolution" and the "horizontal resolution" each represent a resolution per unit area).

1.2.2. Step of Forming Resin Ink Layer

Formation of a resin ink layer (hereinafter appropriately referred to as a second process) in the ink jet recording method according to the present embodiment is to form a layer from the resin ink as described later on the recording medium. The means for forming the layer is not particularly limited, but a known technology can be chosen. For example, the layer may be formed by the head 9 using the ink jet recording apparatus as described above or may be applied by an analog coater used in the related art, such as a bar coater, a blade coater, a roll coater, a spray coater, a slit coater, and the like. When the ink jet recording apparatus is used, it is possible to form layers at any places, which is thus favorable. On the other hand, the analog coater is excellent in terms of a wide limit range of the viscosity of the resin ink and high-speed application of the ink. Examples of the commercially available products of the analog coater include a K Hand Coater (manufactured by Matsuo Industry Corporation), a Bar Coater (manufactured by Daiichi Rika Co., Ltd.), a Capilary Coater of Small & Low Capacity Type (manufactured by Hirano Tecseed Co., Ltd.), a No. 579 Bar Coater (manufactured by Yasuda Seiki Seisakusho Ltd.), and the like.

As one of the functions of the layer formed in the present process, there is an effect of inhibiting the unevenness of the surface layer of the white ink layer, and accordingly, in the case where the unevenness is high, the glitter pigment is not aligned well on the recording medium, and as a result, good glitter cannot be obtained. Further, allowing penetration of the solvent in the glitter ink into the resin ink layer, thereby aligning the glitter pigment flatly on the surface of the recording medium may be mentioned. Also, there are a case where the resin ink layer is clearly separated from the glitter layer as described later and a case where the interface therebetween is not clearly separated. In addition, as one of the functions of the layer formed in the present process, improving the abrasion resistance of the glitter ink (recorded matter) may be mentioned.

Furthermore, in the second process of the resin ink layer, the arithmetic mean roughness Ra of the surface of the formed resin ink layer is preferably 20 μm or less. Thus, even when the surface of the surface layer of the white ink is rough, the glitter pigment is aligned smoothly, whereby high gloss (glitter) is exhibited. As the relationship between the glitter ink layer and the resin ink layer, as the film thickness of the resin ink layer increases, the glitter (glossy) of the glitter ink layer increases. When any resin ink layer is no less than a specific film thickness, the increase in the glitter is settled. As a means for forming a high film thickness, in the case of an ink jet recording method, there is a method for increasing a recording intensity (duty) or a method for increasing the discharging amount. Further, a white ink layer on which a resin ink is formed can increase the glitter of the glitter layer by providing a resin ink layer even when the arithmetic mean roughness is 20 μm or more. Further, the arithmetic mean roughness (Ra) can be measured, for example, by a sum of surface roughnesses or by means of a light interference type microscope, and specific examples of the apparatus for measuring the surface roughness include a Stepped/Surface Roughness/Fine Shape Measurement Apparatus P-15 (manufactured by KLA-Tencor Corporation), and the like.

Furthermore, the surface roughness of the resin ink layer has a close relationship with the glossy of the resin ink layer. It also has a close relationship with the glossy of the resin ink layer and the glossy of the glitter ink layer as described later. As for the preferable refractive index range (1.4 to 1.6) of the resin included in the resin ink according to an aspect of the invention of the present application, the glossy at 60° of the resin ink layer is preferably 20 or more, more preferably 45 or more, even more preferably 70 or more, and still even more preferably 90 or more. Here, the glossy at 60° of the resin can be measured using a commercially available glossmeter and the glossy at 60° of the resin ink layer as described above is a value measured at a swing angle of 60° using a glossmeter (MINOLTA MULTI GLOSS 268).

The second process of the resin ink layer further preferably includes drying the resin ink layer by means of a heating means. By including drying, it is possible to form a resin ink layer in which a surface layer has good smoothness by drying, and thus, as compared with a case not including heating, recorded matter having high gloss (glitter) can be obtained. As a heating means, the platen 3 may be heated to function as a heater, a means for blowing warm air into an apparatus may be provided and correspondingly heating may be performed, or radiant heat may be used for heating by a heater ray or the like. Alternatively, other known heating means may be used. The heating temperature can be appropriately chosen according to the heat resistance of the recording medium, or the like. For example, in the case where plain paper is chosen as a recording medium, there is no heat-sensitive layer such as plastic or the like, and as a result, the heating can be carried out at a high temperature, for example, at 20 to 150° C., preferably 25 to 110° C., more preferably 30 to 100° C., and particularly preferably 40 to 90° C. With this, the drying rate of the resin ink can be increased. Further, drying may be carried out at the same time with the second process or may be carried out after completion of the second process.

Moreover, the drying process in which the shape of the smooth surface of the resin ink layer can be maintained early on is effective, but is not necessarily provided. In addition, the method for maintaining the shape of the underlayer may be a method for curing a resin ink using active energy rays. The active energy rays are not particularly limited as long as they can apply energy capable of generating an initiation species from a polymerization initiator by the irradiation, and examples thereof widely include α-rays, γ-rays, β-rays, ultraviolet rays, visible light, electron beam, and the like. Among these, from the viewpoints of curing sensitivity and easy availability of an apparatus, the active energy rays are preferably ultraviolet rays and electron beams, and particularly preferably ultraviolet rays.

The resin ink layer formed in the present process is not particularly limited in its amount or thickness as long as the arithmetic mean roughness of the recording medium is small, but the arithmetic mean roughness Ra is preferably 20 µm or less, and more preferably 10 µm or less. Thus, the glitter pigment can be aligned more smoothly on the surface of the recording medium, whereby it is possible to record (form) an image having particularly excellent glitter.

The film thickness of the resin ink layer is preferably 0.1 to 30 µm, and more preferably from 1 to 15 µm. If the film thickness of the resin ink layer is less than 0.1 µm, an effect of penetrating the glitter ink into a solvent or an effect of smoothening the glitter pigment may be insufficient in some cases.

1.2.3. Step of Forming Glitter Layer

Formation of a glitter ink layer (hereinafter appropriately referred to as a third process) in the ink jet recording method according to the present embodiment is carried out by discharging liquid droplets of the glitter ink on the underlayer using the above-described ink jet recording apparatus to be adhered on the recording medium. As one of the functions of the glitter ink layer formed in the present process, forming a glitter side on the recording medium may be mentioned. The film thickness of the glitter ink layer is preferably 0.02 to 10 µm, and more preferably 0.05 to 5 µm. If the film thickness of the glitter ink layer is less than 0.02 µm, the transmitted light to the reflected light on the surface of the glitter layer is increased, and consequently, it may be impossible to obtain sufficient glitter in some cases.

Formation of a glitter ink layer can be carried out, for example, at room temperature or at a higher temperature. In a case where plain paper is chosen as the recording medium, formation of a glitter ink layer can be carried out at a higher temperature, for example, 20 to 150° C., preferably 25 to 110° C., more preferably 30 to 100° C., and particularly preferably 40 to 90° C. Thus, the drying rate when the solvent is contained in the glitter ink can be increased.

Moreover, it is more preferable that the recording method includes a first mode, in which drying is carried out, and after drying, the third process is carried out, and a second mode in which while drying is not carried out, the third process is carried out. Thus, in the case where recorded matter having high gloss (glitter) is desired, a glitter ink layer is formed in the first mode, and in the case where recorded matter having slightly suppressed gloss is desired, a glitter ink layer can be formed in the second mode, whereby an even wider range of gloss can be exhibited.

In addition, in the case where a recording medium having a region having high gloss and a region having slightly suppressed gloss is desired, it is possible to obtain recorded matter having desired gloss by providing drying involving partial heating (for example, partially blowing warm air, partially heating a platen, and the like). Also, by carrying out recording with the glitter ink in a region in which slightly suppressed gloss is desired (second mode) and then including drying to form a region requiring high gloss with the glitter ink again (first mode), whereby recorded matter having desired gloss can be obtained. Thus, a mode in which the formation is carried out in the second mode, and then the formation is carried out in the first mode is referred to as a third mode in the invention.

1.3. Recording Medium and Recorded Matter

In the present embodiment, by carrying out the first process, the second process, and the third process, and carrying out recording on the recording medium, recorded matter including a region having a high hiding property and exhibiting high glitter can be obtained.

2. Ink Set

The ink set for ink jet recording according to the present embodiment is an ink set used for recording an image having glitter on a transparent recording medium using an ink jet recording apparatus, and includes a white ink, a resin ink, and a glitter pigment ink (hereinafter also referred to as a glitter ink). Further, examples of the ink set include an ink set including a white ink, a resin ink, and a glitter pigment ink. The ink set may include one or a plurality of the inks and the ink set may further include one or a plurality of inks containing other ink. Examples of other inks included in the ink set include color ink such as cyan, magenta, yellow, light cyan, light magenta, dark yellow, red, green, blue, orange, violet, and other colored ink, black ink, light black ink, and the like.

2.1. White Ink 2.1.1. Metal Oxide Particles

The white ink may contain metal oxide particles as a white color material. Examples of the metal oxide particle include titanium dioxide, zinc oxide, silica, alumina, magnesium oxide, zirconium oxide, and the like. Among these, it is preferable to use titanium dioxide particles having a powder form of titanium dioxide from the viewpoint of excellent whiteness.

The volume average diameter (Mv) of the metal oxide particle is preferably 100 nm or more and 700 nm or less, and more preferably 200 nm or more and 600 nm or less. If the volume average diameter (Mv) of the metal oxide particle is more than the above-described range, the dispersion stability is deteriorated, for example, as the particles settle down in some cases, and also, when applied in an ink jet recording apparatus, clogging of the head 9, or the like may occur in some cases. On the other hand, when the volume average diameter (Mv) of the metal oxide particle is less than the above-described range, the whiteness tends to be insufficient.

Furthermore, in the case where a titanium dioxide particle is used as a white color material, the volume average diameter (Mv) of the titanium dioxide particle is preferably 280 nm or more and 440 nm or less. This enables good discharging from the head 9 by means of an ink jet recording apparatus, and thus, it becomes possible to record a white ink layer having good whiteness. On the other hand, even when the particle diameter is large, a layer having high glitter (glossy) can be recorded by inserting a resin therebetween.

As the titanium dioxide particle, commercially available products can be used, and examples thereof include ultrafine particles of the titanium oxide TTO Series (manufactured by Ishihara Sangyo Kaisha Ltd.), fine particles of titanium oxide (manufactured by Tayca Corporation), NanoTek® Slurry (manufactured by C. I. Kasei Co., Ltd.), and the like.

The volume average diameter (Mv) in the invention is measured by a particle size distribution measurement apparatus with a measurement principle of a dynamic light scattering method, for example, using a Nanotrac Particle Size Distribution Measurement Apparatus, UPA-EX150 (trade name, manufactured by Nikkiso Co., Ltd.). Further, the volume average diameter (Mv) refers to a volume weighted average diameter and is calculated by the following equation on the basis of the measured values of the volume and the diameter of each particle.

$$\text{Volume Average Diameter } (Mv) = \Sigma(Vi \cdot di)/\Sigma(Vi)$$

(wherein Vi represents the volume of a particle i (i=1, 2, . . . , N) and di represents the diameter of the particle i (i=1, 2, . . . , N)).

2.1.2. Particle Having Hollow Structure

The white ink may contain a particle having a hollow structure as a white color material. The particle having a hollow structure is not particularly limited and known ones can be used. For example, the particle described in the specifications of U.S. Pat. No. 4,880,465, JP Patent No. 3,562,754, or the like can be preferably used.

A method for preparing a particle having a hollow structure is not particularly limited, and for example, known methods as below can be employed. Examples of the method for preparing a resin having a hollow structure include a method in which vinyl monomers, a surfactant, a polymerization initiator, and a water-based dispersion medium are heated and stirred under a nitrogen atmosphere to form an emulsion of particles having hollow structures, a so-called emulsion polymerization method, or a method described in JP-T-2000-500113, JP-A-2009-234854, or the like. Further, as a particle formed from an organic compound having a hollow structure, a commercially available product can be used. Examples of the commercially available product include sx866 Series (manufactured by JSR Corporation), and the like.

The particle having a hollow structure has a core/shell structure and thus, has an outer diameter and an inner diameter. The average particle diameter (outer diameter) (d50) is preferably 100 nm or more and 700 nm or less, and more preferably 200 nm or more and 600 nm or less. If the outer diameter of the particle having a hollow structure is within the above-described range, good dispersion in the white ink can be maintained, and further when adhered to a recording medium, an image having good whiteness can be obtained. On the other hand, if the outer diameter is more than 700 nm, the dispersion stability is deteriorated, for example, the particles settle down in some cases, and also, when applied in an ink jet recording apparatus, clogging of a head or the like may occur in some cases. On the other hand, if the outer diameter is less than 100 nm, the whiteness may be insufficient in some cases. Further, the inner diameter of the particle having a hollow structure (that is, the outer diameter of the above-described core) is preferably approximately 100 nm or more and 500 nm or less. The volume average diameter (Mv) of the particles having a hollow structure can be measured by the same method as for the volume average diameter (Mv) of the metal oxide particles.

2.1.3. Resin

The white ink can contain water-soluble and/or water-insoluble resin component(s). The resin component can solidify the white ink and fix the solidified white ink strongly on a recording medium or can disperse white color materials in the white ink. The resin component may be in the state of being dissolved in ink or the state of being dispersed in ink.

Specific examples of the resin component include polyacrylic acid, polymethacrylic acid, polymethacrylic ester, polyethylacrylic acid, styrene-butadiene copolymers, polybutadiene, acrylonitrile-butadiene copolymers, chloroprene copolymers, fluorine resins, vinylidene fluoride, polyolefin resins, cellulose, styrene-acrylic acid copolymers, styrene-methacrylic acid copolymers, polystyrene, styrene-acrylamide copolymers, polyisobutyl acrylate, polyacrylonitrile, polyvinyl acetate, polyvinyl acetal, polyamide, rosin-based resins, polyethylene, polycarbonate, vinylidene chloride resins, cellulose resins such as cellulose acetate butyrate, vinyl acetate resins, ethylene-vinyl acetate copolymers, vinyl acetate-acrylate copolymers, vinyl chloride resins, polyurethane, rosin esters, and the like, but are not limited thereto.

The molecular weight of the resin component is preferably in the range of 1,000 to 100,000, and more preferably in the range of 3,000 to 10,000, in terms of a weight average molecular weight. If the molecular weight is within the above-described range, stable dispersion of the white color material in water can be obtained, and further, when applied in ink, it is easy to control the viscosity, for example.

The content (solid content) of the resin component is preferably 0.1% by mass or more and 15% by mass or less, and more preferably 0.5% by mass or more and 10% by mass or less based on the total mass of the white ink. If the content of the resin component is within this range, it can solidify/fix the white ink or can improve the dispersibility of the white color material, which is thus preferable.

2.1.4. Organic Solvent

The white ink may contain an organic solvent. The white ink may contain plural kinds of organic solvents. Examples of the organic solvent used in the white ink include 1,2-alkanediols, polyhydric alcohols, and pyrrolidone derivatives.

Examples of the 1,2-alkanediols include 1,2-propanediol, 1,2-butanediol, 1,2-pentanediol, 1,2-hexanediol, and 1,2-octanediol. Since the 1,2-alkanediols have an excellent action to increase the wetting property of the white ink in a recording medium, thereby uniformly wetting it, an excellent image can be formed on the recording medium. The content of the 1,2-alkanediols is preferably 1% by mass or more and 20% by mass or less, based on the total mass of the white ink.

Examples of the polyhydric alcohols include ethylene glycol, diethylene glycol, propylene glycol, dipropylene glycol, 1,3-propanediol, 1,4-butanediol, 1,6-hexanediol, glycerin, and the like. When the white ink is used in the ink jet recording apparatus, the polyhydric alcohols function to inhibit the ink from drying on the nozzle surface of the head, and thus, prevent clogging, discharging failure, or the like, which can thus be preferably used. The content of the polyhydric alcohols is preferably 2% by mass or more and 20% by mass or less, based on the total mass of the white ink.

Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. The pyrrolidone derivative can function as a good solubilizing agent for resin components. The content of the pyrrolidone derivative is preferably 3% by mass or more and 25% by mass or less, based on the total mass of the white ink.

2.1.5. Surfactant

The white ink can contain a surfactant. Examples of the surfactant include a silicon-based surfactant, an acetylene glycol-based surfactant, and the like.

As the silicon-based surfactant, a polysiloxane-based compound or the like is preferably use, and examples thereof include polyether-modified organosiloxane and the like, and more specifically, BYK-306, BYK-307, BYK-333, BYK-341, BYK-345, BYK-346, and BYK-348 (all trade names, manufactured by BYK-Chemie, Japan K. K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and the like. The silicon-based surfactant can be preferably used from the viewpoint that it functions to spread the white ink widely so as not to cause tint nonuniformity or blurs on the recording medium. The content of the silicon-based surfactant is preferably 0.1% by mass or more to 1.5% by mass or less, based on the total mass of the white ink.

Examples of the acetylene glycol-based surfactant include Surfynol (registered trademark) 104, 104E, 104H, 104A, 104BC, 104DPM, 104PA, 104PG-50, 104S, 420, 440, 465, 485, SE, SE-F, 504, 61, DF37, DF110D, CT111, CT121, CT131, CT136, TG, and GA (all trade names, manufactured by Air Products and Chemicals, Inc.); Olfine (registered trademark) B, Y, P, A, STG, SPC, E1004, E1010, PD-001, PD-002 W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.); Acetylenol E00, E00P, E40, and E100 (all trade names, manufactured by Kawaken Fine Chemicals Co., Ltd.); and the like. The acetylene glycol-based surfactant has characteristics that it has an excellent ability to appropriately keep surface tension and interfacial tension and has almost no foaming property, as compared with other surfactants. The content of the acetylene-based surfactant is preferably 0.1% by mass or more to 1.0% by mass or less, based on the total mass of the white ink.

2.1.6. Water

The white ink according to the present embodiment may be an ink containing 50% or more of water, a so-called water-based ink. The water-based ink causes less inconvenience, such as a weak reactivity with a piezo element used in a recording head, an organic binder or the like used in a recording medium, or the like, melt-down, and corrosion, as compared with non-water-based (solvent-based) ink (for example, refer to JP-A-2007-16103 for ink used in recorded matter). Also, with the non-water-based (solvent-based) ink, if the solvent used has a high boiling point/low viscosity, there occurs a problem that it takes a long time to be dried. In addition, as compared with the solvent-based ink, the water-based ink has a highly suppressed odor, and water makes up half of the ink, which is advantageous in that it is favorable for the environment.

2.1.7. Other Components

The white ink can include the addition of a pH adjuster, a polyolefin wax, a preservative/fungicide, a rust inhibitor, a chelating agent, or the like. When these materials are added, the characteristics of the white ink are further improved, which is thus preferable.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, and the like.

Examples of the polyolefin wax include waxes prepared from olefins such as ethylene, propylene, butylene, and the like, or derivatives thereof, and copolymers thereof, and specifically, a polyethylene-based wax, a polypropylene-based wax, a polybutylene-based wax, and the like. As the polyolefin wax, commercially available products can be used, and specifically, Nopcoat PEM17 (trade name, manufactured by SAN NOPCO Limited), Chemipearl W4005 (trade name, manufactured by Mitsui Chemicals, Inc.), and Aquacer 515 and Aquacer 593 (trade name, manufactured by BYK-Chemie, Japan K. K.), or the like can be used. When the polyolefin wax is added to the white ink, the abrasion resistance of the image can be improved, which is thus preferable. The content of the polyolefin wax is preferably 0.01% by mass or more and 10% by mass or less, and more preferably 0.05% by mass or more and 1% by mass or less, based on the total mass of the white ink.

Examples of the preservative/fungicide include sodium benzoate, sodium pentachlorophenol, sodium 2-pyridinethiol-1-oxide, sodium sorbate, sodium dehydroacetate, 1,2-dibenzisothiazolin-3-one, and the like. Examples of the commercially available product thereof include Proxel XL2 and Proxel GXL (all trade names, manufactured by Avecia Biocides), Denicide CSA and NS-500 W (trade names, manufactured by Nagase ChemteX Corporation), and the like.

Examples of the rust inhibitor include benzotriazole and the like.

Examples of the chelating agent include ethylenediamine tetraacetic acids and salts thereof (disodium dihydrogen ethylenediamine tetraacetate and the like), etc.

2.2. Resin Ink

The resin ink according to the present embodiment may be a transparent resin ink containing a resin.

2.2.1. Water-Soluble Resin Solvent

The water-soluble resin solvent is selected from water-soluble solvents that are compatible with the resin simultaneously added to the resin ink. Although an optimum combination varies in accordance with a resin to be used, for example, water-soluble heterocyclic compounds, water-soluble alkylene glycol alkyl ethers, and the like are preferred, and pyrrolidones such as N-methyl-2-pyrrolidone, N-ethyl-2-pyrrolidone, N-vinyl-2-pyrrolidone, 2-pyrrolidone, and the like, lactones such as γ-butyrolactone and the like, sulfoxides such as dimethyl sulfoxide and the like, lactams such as ε-caprolactam and the like, esters such as methyl lactate, ethyl lactate, isopropyl lactate, butyl lactate, and the like, oxyalkylene glycol ethers such as ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, dipropylene glycol monopropyl ether, and the like, and cyclic ethers such as 1,4-dioxane and the like are more preferred. In particular, pyrrolidones and alkylene glycol monoalkyl ethers such as propylene glycol monomethyl ether, dipropylene glycol monomethyl ether, dipropylene glycol monopropyl ether, and the like are preferred from the viewpoints of preservation stability of the resin ink, a sufficient drying rate, and promotion of the film formation of the underlayer.

The amount of the water-soluble resin solvent to be added is preferably 1.0% by mass to 50.0% by mass, and more preferably 2.0% by mass to 25.0% by mass, based on the total amount of the resin ink. When the amount of the water-soluble resin solvent to be added is less than 1.0% by mass, there is a difficulty in film formation of the resin and the wax in the resin ink, and thus insufficient solidification/fixation of the resin ink may be caused in some cases. On the other hand, when the amount of the water-soluble resin solvent to be added is more than 50% by mass, the preservation stability of the resin ink may be deteriorated in some cases.

2.2.2. Resin

For use in the ink jet recording apparatus, the viscosity of each ink can be inhibited to be low with the addition of sufficient amounts of the resin components to the resin ink by selecting a resin insoluble in water and the discharging stability in the high-speed recording can be ensured, which is thus preferable. By using the resin ink, a strong resin ink layer is formed after recording.

Specific examples of such a dispersible resin are the same as in 2.1.3. above.

The resin is preferably included in an amount ranging from 1% by mass to 50% by mass, in terms of solids, and preferably from 4% by mass to 25% by mass, based on the total amount of the resin ink. For the preferable range of the resin content, the upper limit is stipulated in consideration of optimum ink jet physical properties and reliability (clogging, discharging stability, or the like) of the resin ink, and the lower limit is stipulated so as to effectively achieve the effect (abrasion resistance or the like) of the invention.

2.2.3. Wax

The water-based resin ink may further include a wax. In this regard, the wax is characterized in that it decreases the frictional resistance of an ink film surface after drying. Examples of the component constituting the wax include plant/animal-derived waxes such as carnauba wax, candelilla wax, beeswax, rice wax, lanolin, and the like; petroleum waxes such as a paraffin wax, a microcrystalline wax, a polyethylene wax, a polyethylene oxide wax, petrolatum, and the like; mineral waxes such as a montan wax, ozokerite, and the like; synthetic waxes such as a carbon wax, a Hoechst wax, a polyolefin wax, stearic acid amide, and the like; natural/synthetic wax emulsions such as an α-olefin-maleic anhydride copolymer; blended waxes; and the like. These waxes can be used singly or in combination thereof. Among these waxes, polyolefin wax, particularly polyethylene wax and polypropylene wax are preferred. Furthermore, polyethylene wax is more preferred in consideration of abrasion resistance to a non-ink-absorbing or low-ink-absorbing recording medium. A commercially available wax can be used as it is. Examples of the commercially available wax include Nopcoat PEM17 (trade name, manufactured by San Nopco Limited), Chemipearl W4005 (trade name, manufactured by Mitsui Chemicals, Inc.), Aquacer 515 (trade name, manufactured by BYK-Chemie, Japan K. K.), and the like.

The wax content in the water-based resin ink in terms of solids is preferably 0.5% by mass to 6% by mass, and more preferably 1% by mass to 3% by mass in the resin ink. For the preferable range of the wax content, the upper limit is stipulated in consideration of optimum ink jet physical properties and reliability (clogging, discharging stability, or the like) of the resin ink, and the lower limit is stipulated so as to effectively achieve the effect (abrasion resistance or the like) of the invention.

With regard to the recorded matter in which a layer is formed with the above-described resin ink and a layer of the glitter pigment is recorded thereon, the glitter pigment can be aligned smoothly on the surface layer, which increases the gloss. Further, consequently, it is possible to exhibit the glitter even with recording media in the related art, which cannot exhibit the glitter. Also, the abrasion resistance as the recorded matter is improved, and thus, a strong underlayer can be formed. The reason why the abrasion resistance is improved is still unclear, but is inferred to be as follows. The resin has characteristics that it is firmly fixed on a recording medium, and simultaneously strengthens the resin film after drying. On the other hand, the wax has characteristics whereby it decreases the frictional resistance of the resin film surface. As a result, the resin film that is not easily shaved off due to rubbing from the outside and is not easily detached from the recording medium can be formed. Thus, it is believed that the abrasion resistance of the recorded matter is improved. In addition, if the layer is formed with the resin ink, there are effects that the resin ink exhibits a function as an ink-receiving layer and the bleeding of the glitter pigment onto the recording medium is prevented, and thus, it becomes possible to carry out good recording. Also, even when it is possible to improve the fixability and drying properties of the glitter ink itself drastically, it is necessary to increase the average particle diameter of the pigment particles in order to ensure the glossiness. Accordingly, it is also possible to lower the recording reliability when the recording is carried out from the head and cause clogging or deteriorated recording, and thus, it is advantageous to form a resin ink layer since there is no problem as described above.

2.2.4. Water

Water is the same as in 2.1.6. described above, and thus is not described again herein.

2.2.5. Other Components

The resin ink optionally includes a surfactant and a water-soluble solvent as other components. The amounts thereof to be added can be suitably adjusted in accordance with the types of the recording medium and the ink. Examples of other optional additives include a humectant, a preservative/fungicide, a pH adjuster, an antioxidant/ultraviolet light absorber, a metal trapping agent, and the like.

1. Surfactant

The surfactant is the same as in 2.1.5. described above, and thus is not described again.

1. Water-Soluble Solvent

In a synergic combination with a surfactant as described later, a water-soluble solvent functions to increase the wettability of the resin ink to a recording medium so as to achieve uniform wettability. Therefore, it is preferable that the water-soluble solvent be contained in the resin ink because an underlayer can be formed uniformly. Examples of the water-soluble solvent include a monohydric alcohol or a polyhydric alcohol, and a derivative thereof.

As the monohydric alcohol, particularly monohydric alcohols having 1 to 4 carbon atoms, such as methanol, ethanol, n-propanol, i-propanol, n-butanol, and the like, can be used.

As the polyhydric alcohol and a derivative thereof, divalent to pentavalent alcohols having 2 to 6 carbon atoms and an ether or a partial ether between the divalent alcohol to the pentavalent alcohol and a lower alcohol having 1 to 4 carbon atoms can be used. Here, a polyhydric alcohol derivative is an alcohol derivative in which at least one hydroxyl group is etherified and is not a polyhydric alcohol itself that does not include an etherified hydroxyl group.

Specific examples of the polyhydric alcohol and the lower alkyl ether thereof include diols such as 1,2-hexanediol, 1,3-hexanediol, 1,2-heptanediol, 1,3-heptanediol, 1,2-octanediol, 1,3-octanediol, 1,2-pentanediol, and the like; mono-, di-, or triethylene glycol-mono or dialkyl ethers; and mono-, di-, or tripropylene glycol-mono or dialkyl ethers, and preferably 1,2-hexanediol, triethylene glycol monobutyl ether, diethylene glycol monobutyl ether, diethylene glycol monopropyl ether, diethylene glycol monopentyl ether, diethylene glycol-2-ethylhexylethyl, or propylene glycol monobutyl ether, and the like.

The content of the water-soluble solvent in the total amount of each color ink is, for example, 0.5% by mass to 15.0% by mass, and preferably 1.0% by mass to 8.0% by mass.

2. Humectant

Examples of the humectant include polyhydric alcohols, sugars, sugar alcohols, and the like, such as ethylene glycol, diethylene glycol, propylene glycol, dipropylene glycol, 1,3-propanediol, 1,4-butanediol, hexylene glycol, 2,3-butanediol, and the like.

3. Preservative/Fungicide

Examples of the preservative/fungicide include sodium benzoate, sodium pentachlorophenol, sodium 2-pyridinethiol-1-oxide, sodium sorbate, sodium dehydroacetate, 1,2-dibenzisothiazolin-3-one (Proxel CRL, BDN, GXL, XL-2, and TN, manufactured by ICI Corporation), and the like.

4. pH Adjuster

Examples of the pH adjuster include amines such as diethanolamine, triethanolamine, propanolamine, morpholine, and the like, and modified products thereof, inorganic bases such as potassium hydroxide, sodium hydroxide, lithium hydroxide, and the like, carbonates such as ammonium hydroxide, quaternary ammonium hydroxide (tetramethyl ammonium and the like), potassium carbonate, sodium carbonate, and lithium carbonate, and other phosphates.

5. Antioxidant/Ultraviolet Light Absorber

Examples of the antioxidant/ultraviolet light absorber include allophanates such as allophanate, methyl allophanate, and the like; biurets such as biuret, dimethyl biuret, tetramethyl biuret, and the like; L-ascorbic acid and salts thereof, and the like; and Tinuvin 328, 900, 1130, 384, 292, 123, 144, 622, 770, and 292, Irgacor 252 and 153, Irganox 1010, 1076, 1035, and MD 1024, manufactured by Ciba-Geigy K. K.; lanthanide oxides; and the like.

6. Metal Trapping Agent

Examples of the metal trapping agent include chelating agents such as disodium ethylenediaminetetraacetate and the like.

7. Polymerizable Compound and Polymerization Initiator

The resin ink may contain a polymerizable compound, a polymerization initiator, or the like, which is used in the related art, when curing is performed by a polymerization reaction through activated energy rays. Examples of the polymerization initiator include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxantone, 2-chlorothioxantone, isopropylthioxantone, 2-methylthioxantone, polychlorinated polyphenyl, hexachlorobenzene and the like.

Furthermore, examples of the polymerizable compound include polyester acrylate, polyurethane acrylate, epoxy acrylate, polyether acrylate, oligoacrylate, alkyd acrylate, polyol acrylate, diethylene glycol diacrylate, neopentyl glycol diacrylate, 1,6-hexanediol diacrylate, hydroxypiopelinic acid ester neopentyl glycol diacrylate, trimethylol propane triacrylate, pentaerythritol triacrylate, dipentaerythritol hexaacrylate, acryloylmorpholine, 2-phenoxyethyl acrylate, hydrogen-(2,2,2-triacryloyloxymethyl)ethyl phthalate, dipentaerythritol polyacrylate, dipentaerythritol polyacrylate, N-vinyl formamide, tripropylene glycol diacrylate, glycerin E0 adduct triacrylate, and the like.

2.3. Glitter Ink

The glitter ink (hereinafter appropriately referred to as a glitter ink) contains a glitter pigment and an organic solvent. Hereinbelow, the components that the glitter ink contains will be explained.

2.3.1. Glitter Pigment

As a glitter pigment that the glitter ink contains, any one which falls in a range capable of discharging the liquid droplets of the ink according to an ink jet recording method can be used. The glitter pigment functions to provide glitter when the glitter ink is adhered onto the resin ink layer, and it can also provide glitter for the adhered. Examples of such a glitter pigment include a pearl pigment and a glitter pigment. Typical examples of the pearl pigment include pigments having pearlescent gloss or interference gloss, such as mica coated with titanium dioxide, fish scale foil, bismuth oxychloride, and the like. On the other hand, examples of the glitter pigment include particles of aluminum, silver, gold, platinum, nickel, chromium, tin, zinc, indium, titanium, copper, or the like, and at least one selected from these single ones or an alloy thereof, and a mixture thereof can be used.

From the viewpoints of the level of a glossy (glitter) and the cost, the glitter pigment used in the present embodiment is preferably aluminum or an aluminum alloy. When the aluminum alloy is used, other metal elements or non-metal elements that can be added to aluminum are not particularly limited as long as the elements have a glitter gloss, but examples thereof include silver, gold, platinum, nickel, chromium, tin, zinc, indium, titanium, copper, and the like. At least one selected from these elements can be preferably used. Further, as the organic solvent as described later used in the glitter ink, one having a low reactivity with a metal is appropriately chosen, and thus, there is no need to subject the glitter pigment used in the invention to a special surface treatment.

The glitter pigment according to the present embodiment has a 50% average particle diameter (d50) in terms of sphere determined by a light scattering method of 0.8 to 1.2 µm.

The 50% average particle diameter in terms of a sphere determined by a light scattering method is measured and derived as follows. More specifically, the diffraction dispersion light generated by irradiating the particles in a dispersion medium with light is measured by disposing detectors at each portion of the front side, the lateral side, and the back side, and a point where the distribution curve of the cumulative percentage of the average particle diameter to be measured intersects the horizontal axis of the 50% cumulative percentage is defined as a 50% average particle diameter (d50). Further, the average particle diameter in terms of a sphere indicates an average particle diameter determined from measurement results, assuming that particles that are originally amorphous have a spherical shape. As a measurement apparatus, a laser diffraction scattering type particle size distribution measurement apparatus LMS-2000e manufactured by Seishin Enterprise Co., Ltd., and the like are mentioned. Based on the fact that the 50% average particle diameter in terms of sphere (d50) determined by a light scattering method is in the range above, a coating film having high glitter can be formed on recorded matter and ink discharging stability from a nozzle also becomes high.

The glitter pigment is preferably one produced by crushing a metal vapor-deposition film and is preferably in the form of plate-like particles. When the glitter pigment is in the form of plate-like particles and the long diameter, the short diameter, and the thickness on the plane of the plate-like particles are defined as X, Y, and Z, respectively, the 50% average particle diameter R50 of the circle-equivalent diameter determined from the area of the X-Y plane of the plate-like particles is preferably 0.5 to 3 µm and the condition of R50/Z>5 is preferably satisfied.

The "plate-like particles" refer to particles having a substantially flat surface (X-Y plane) and having a substantially uniform thickness (Z). Since the plate-like particles are produced by crushing a metal vapor-deposition film, metal particles having a substantially flat surface and a substantially uniform thickness can be obtained. Accordingly, the long diameter, the short diameter, and the thickness on the plane of the plate-like particles can be defined as X, Y, and Z, respectively.

The "circle-equivalent diameter" refers to, when the substantially flat surface (X-Y plane) of the plate-like particles of the glitter pigment is assumed to be a circle having the same projected area as the projected area of the particles of the glitter pigment, the diameter of the circle. For example, when the substantially flat surface (X-Y plane) of the plate-like particles of the glitter pigment is a polygon, the circle-equivalent diameter of the plate-like particles of the glitter pigment is the diameter of a circle obtained by converting the projected area of that polygon to a circle.

The 50% average particle diameter R50 of the circle-equivalent diameter determined from the area of the X-Y plane of the plate-like particles is more preferably 0.5 to 3 µm, and even more preferably 0.75 to 2 µm from the viewpoint of glitter and recording stability. When the 50% average particle diameter R50 is less than 0.5 µm, the gloss becomes insufficient. In contrast, when the 50% average particle diameter R50 is more than 3 µm, the recording stability decreases.

Furthermore, from the viewpoint of securing high glitter, the relationship between the 50% average particle diameter R50 of the circle-equivalent diameter and the thickness Z is R50/Z>5. When R50/Z is 5 or less, there is a problem that the glitter is insufficient.

The maximum particle diameter Rmax of the circle-equivalent diameter determined from the area of the X-Y plane of the plate-like particles is preferably 10 µm or less from the viewpoint of preventing clogging of the ink in an ink jet recording apparatus. When the Rmax is adjusted to 10 µm or less, clogging of a nozzle of an ink jet recording apparatus, a mesh filter provided in an ink flow path, and the like can be prevented.

According to a method for producing the glitter pigment, the interface between a metal or alloy layer and a resin layer for peeling of a composite pigment base material having a structure such that the resin layer for peeling and the metal or alloy layer are successively laminated on a sheet-shaped base material is defined as the boundary, the metal or alloy layer is peeled from the sheet-shaped base material, crushed, and pulverized, thereby obtaining plate-like particles. Among the obtained plate-like particles, particles having a 50% average particle diameter in terms of sphere (d50) determined by a light scattering method of 0.8 to 1.2 µm are fractionated. Alternatively, when the long diameter, the short diameter, and the thickness on the plane of the obtained plate-like particles are defined as X, Y, and Z, respectively, particles in which the 50% average particle diameter R50 of the circle-equivalent diameter determined from the area of the X-Y plane of the plate-like particles is 0.5 to 3 µm and the condition of R50/Z>5 is satisfied are fractionated.

The long diameter, the short diameter, and the circle-equivalent diameter on the plane of the glitter pigment can be measured using a particle image analyzer. As the particle image analyzer, for example, flow-type particle image analyzers, FPIA-2100, FPIA-3000, and FPIA-3000S, manufactured by Sysmex Corporation, can be utilized.

The particle size distribution (CV value) of the glitter pigment is determined by the following equation.

$$CV \text{ Value} = \text{Standard deviation of particle size distribution/Average particle diameter} \times 100$$

The CV value obtained herein is preferably 60 or less, more preferably 50 or less, and even more preferably 40 or less. By selecting a glitter pigment having a CV value of 60 or less, the effect that the recording stability is excellent can be obtained.

The metal or alloy layer is preferably formed by a vacuum deposition method, an ion plating method, or a sputtering method.

The thickness of the metal or alloy layer is preferably 5 nm or more and 100 nm or less, and more preferably 20 nm or more and 100 nm or less. Thus, pigments having an average thickness of preferably 5 nm or more and 100 nm or less, and more preferably 20 nm or more and 100 nm or less are obtained. By setting the thickness to 5 nm or more, the reflectivity and the glitter are excellent and the performance as the glitter pigment becomes high. By setting the thickness to 100 nm or less, an increase in the apparent specific gravity can be suppressed so that the dispersion stability of the glitter pigment can be secured.

The resin layer for peeling in the composite pigment base material is an under coat layer for the metal or alloy layer and is a peelable layer for increasing the peelability from the surface of the sheet-shaped base material. As a resin used in the resin layer for peeling, for example, polyvinyl alcohol, polyvinyl butyral, polyethylene glycols, polyacrylic acid, polyacrylamide, cellulose derivatives, such as cellulose acetate butyrate (CAB), an acrylic acid polymer, and modified nylon resin are preferred. The layer is formed by applying an aqueous solution of one member or a mixture of two or more members of the above-mentioned resins to a recording medium, drying, and the like. After the application, additives such as a viscosity regulator and the like can be included.

The application of the resin layer for peeling is carried out by gravure coating, roll coating, blade coating, extrusion coating, dip coating, spin coating, or the like, which is generally used. After the application and drying, the surface is smoothed by a calendar treatment, as required.

The thickness of the resin layer for peeling is not particularly limited, but is preferably 0.5 to 50 μm, and more preferably 1 to 10 μm. When the thickness is less than 0.5 μm, the amount as a dispersing resin is insufficient, whereas when the thickness is more than 50 μm, the layer becomes likely to be peeled off from a pigment layer at the interface when rolled.

The sheet-shaped substrate is not particularly limited, but examples thereof include releasable films, for example, polyester films such as polytetrafluoroethylene, polyethylene, polypropylene, polyethylene terephthalate, and the like, polyamide films such as 66 nylon, 6 nylon, and the like, polycarbonate films, triacetate films, polyimide films, and the like. As the sheet-shaped substrate, polyethylene terephthalate or a copolymer thereof is preferred. The thickness of the sheet-shaped substrate is not particularly limited, but is preferably 10 to 150 μm. When the thickness is 10 μm or more, there is no problem in the handling properties in the processes or the like, whereas when the thickness is 150 μm or less, the softness is excellent and there is no problem in rolling, peeling, or the like.

Moreover, the metal or alloy layer may be sandwiched between protective layers as exemplified in JP-A-2005-68250. Examples of the protective layer include a silicon oxide layer and a protective resin layer.

The silicon oxide layer is not particularly limited as long as the layer contains a silicon oxide, but is preferably formed from silicon alkoxides such as tetraalkoxysilane and the like, or a polymer thereof by a sol-gel method. A coating film of the silicon oxide layer is formed by applying an alcohol solution in which the silicon alkoxide or a polymer thereof has been dissolved, and then heating and firing.

The protective resin layer is not particularly limited as long as the resin is not dissolved in a dispersion medium, but examples thereof include polyvinyl alcohol, polyethylene glycol, polyacrylic acid, polyacrylamide, a cellulose derivative, and the like. The protective resin layer is preferably formed from polyvinyl alcohol or a cellulose derivative such as cellulose acetate butyrate and the like. A layer is formed by applying an aqueous solution of one member or a mixture of two or more members of the resins mentioned above, and drying or the like. In the coating liquid, additives such as a viscosity regulator and the like can be included.

The application of the silicon oxide and the resin is carried out in the same manner as in the application of the resin layer for peeling.

The thickness of the protective layer is not particularly limited, but is preferably in the range of 50 to 150 nm. When the thickness is less than 50 nm, the mechanical strength is insufficient, whereas when the thickness is more than 150 nm, the strength becomes excessively high and thus pulverization and dispersion become difficult, and moreover the protective layer is sometimes peeled at the interface with the metal or alloy layer.

The composite pigment base material can have a layer structure having a plurality of multilayer structures in which the resin layer for peeling, the metal or alloy layer, and the protective layer are successively laminated. The total thickness of the plurality of multilayer structures containing the metal or alloy layer, i.e., the thickness of the metal or alloy layer-the resin layer for peeling-the metal or alloy layer or the resin layer for peeling-the metal or alloy layer, excluding the sheet-shaped substrate and the resin layer for peeling immediately above on the sheet-shaped substrate, is preferably 5000 nm or less. When the total thickness is 5000 nm or less, it is difficult for cracks or peeling to occur even when the composite pigment base material is rolled and the preservation is excellent. Moreover, when formed into pigments, the pigments have excellent glitter, and thus are preferable. Further, a structure in which the resin layer for peeling and the metal or alloy layer are successively laminated on both surface of the sheet-shaped substrate can also be mentioned, but the structure is not limited thereto.

A method for performing a peeling treatment from the sheet-shaped base material is not particularly limited. Preferred is a method including ejecting a liquid (solvent) to the composite pigment base material, scratching the metal or alloy layer of the composite pigment base material after the liquid is ejected, and collecting the same, a method including performing a peeling treatment by immersing the composite pigment base material into a liquid, or a method including performing an ultrasonic treatment simultaneously with immersion into a liquid, and then performing a peeling treatment and pulverizing treatment of the peeled composite pigment. According to the methods, in addition to the peeled metal or alloy layer, the liquid used for the peeling treatment can also be collected. As the liquid (solvent) for use in the peeling treatment, a glycol ether solvent, a lactone solvent, or a mixture thereof may be mentioned, for example. A method for crushing and pulverizing the peeled metal or alloy layer is not particularly limited and may be a known method using a ball mill, a bead mill, ultrasonic waves, a jet mill, or the like. Thus, the glitter pigment is obtained.

With regard to the pigment obtained as described above, the resin layer for peeling also serves as a protective colloid, and therefore a stable dispersion can be obtained simply by dispersing in a solvent. In an ink using the pigment, a resin derived from the resin layer for peeling functions to impart adhering properties to a recording medium such as paper and the like.

The concentration of the glitter pigment in ink is preferably 0.5 to 2% by mass when only one ink of an ink set is a metallic ink. When the concentration of the glitter pigment in ink is 0.5% by mass or more and less than 1.7% by mass, a glossy surface like a half mirror, that is, glossy feeling, can be obtained by discharging an ink with the amount that is not sufficient for covering a recording surface but recording in which the background is transparent can be achieved. By discharging an ink with the amount that is sufficient for covering a recording surface, a glitter surface having high gloss can be formed. Therefore, it is suitable for the case where half mirror images are formed on a transparent recording medium or the case of expressing a glitter surface having high gloss, for example. Moreover, when the concentration of the glitter pigment in ink is 1.7% by mass or more and 2.0% by mass or less, the glitter pigment is randomly disposed on a recording surface, and thus high gloss cannot be obtained and a matte glitter surface can be formed. Therefore, it is suitable for the case of forming a shielding layer on a transparent recording medium, for example.

2.3.2. Organic Solvent

As the organic solvent, a polar organic solvent, such as alcohols (for example, methyl alcohol, ethyl alcohol, propyl alcohol, butyl alcohol, isopropyl alcohol, fluorinated alcohol, and the like), ketones (for example, acetone, methyl ethyl ketone, cyclohexanone, and the like), carboxylates (for example, methyl acetate, ethyl acetate, propyl acetate, butyl acetate, methyl propionate, ethyl propionate, and the like), and ethers (for example, diethyl ether, dipropyl ether, tetrahydrofuran, or dioxane, and the like) can be preferably used. In particular, the organic solvent preferably contains one or more kinds of alkylene glycol ether which is liquid under a normal temperature and a normal pressure.

Examples of the alkylene glycol ether include ethylene glycol-based ethers or propylene glycol-based ethers containing, as a base, an aliphatic group, such as methyl, n-propyl, i-propyl, n-butyl, i-butyl, hexyl, and 2-ethyl hexyl, an allyl group having a double bond, and a phenyl group. The alkylene glycol ethers are colorless and have little odor. Since they have an ether group and a hydroxyl group in the molecule, they have the properties of both alcohols and ethers, and are liquid at a normal temperature. Furthermore, the alkylene glycol ethers include monoethers in which only one of the hydroxyl groups is substituted and diethers in which both the hydroxyl groups are substituted, and a plurality of types thereof can be combined for use. In particular, the organic solvent is preferably a mixture of alkylene glycol diether, alkylene glycol monoether, and lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, dipropylene glycol monoethyl ether, and the like.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

Further, examples of the lactone include γ-butyrolactone, δ-valerolactone, ε-caprolactone, and the like.

The advantages of some aspects of the invention can be achieved more effectively and reliably by using such a favorable composition. In particular, a combination of diethylene glycol diethyl ether and γ-butyrolactone, and/or tetraethylene glycol dimethyl ether, and tetraethylene glycol monobutyl ether is more preferable as a combination of the organic solvents.

2.3.3. Resin

The resin is the same as in 2.1.3. above.

2.3.4. Others

The ink preferably contains at least one glycerin, polyalkylene glycol, or sugars. The total amount of the at least one glycerin, polyalkylene glycol, or sugars is preferably 0.1% by mass or more and 10% by mass or less in the ink. By using such a composition, ink discharging is stabilized while preventing the ink from drying and preventing clogging and the image quality of the recorded matter can be made excellent. The polyalkylene glycol is a linear polymer compound having a repetition structure of an ether bond in the main chain and is produced by, for example, ring opening polymerization of a cyclic ether, and the like.

Specific examples of the polyalkylene glycol include a polymer such as polyethylene glycol, polypropylene glycol, and the like, an ethylene oxide-propylene oxide copolymer, and derivatives thereof, and the like. As the copolymer, any copolymer such as a random copolymer, a block copolymer, a graft copolymer, an alternating copolymer, and the like can be used.

Specific preferable examples of the polyalkylene glycol include one represented by the following formula. HO—$(C_nH_{2n}O)_m$—H (wherein n represents an integer of 1 to 5 and m represents an integer of 1 to 100). In the formula, $(C_nH_{2n}O)_m$ may be one fixed number or a combination of two or more kinds of numbers in the range of the integer value n. For example, when n is 3, the formula is $(C_3H_6O)_m$ and when n is a combination of 1 and 4, the formula is $(CH_2O-C_4H_8O)_m$. The integer value m may be one fixed number or a combination of two or more kinds of numbers in the range thereof. For example, in the example, when m is a combination of 20 and 40, the formula is $(CH_2O)_{20}$—$(C_2H_4O)_{40}$ and when m is a combination of 10 and 30, the formula is $(CH_2O)_{10}$—$(C_4H_8O)_{30}$. Furthermore, the integer values n and m may be arbitrarily combined in the range above.

Examples of the saccharide include monosaccharides such as pentose, hexose, heptose, octose, and the like, polysaccharides such as disaccharides, trisaccharides, tetrasaccharides, and the like, sugar alcohols that are derivatives thereof, reduced derivatives such as deoxy acid, oxidized derivatives such as aldonic acid and uronic acid, dehydrated derivatives, such as glycoseen, amino acids, thiosugars, and the like. The polysaccharides refer to a wide range of saccharides and include substances widely found in nature, such as alginic acid, dextrin, cellulose, and the like.

The glitter ink may contain a surfactant. Examples of the surfactant that can be used include an acetylene glycol-based surfactant, sorbitan fatty acid esters (sorbitan monooleate, sorbitan monolaurate, sorbitan sesquioleate, sorbitan oleate, and the like), polyoxyethylene sorbitan fatty acid esters (polyoxyethylene sorbitan monostearate, polyoxyethylene sorbitan monooleate, and the like), polyethylene glycol fatty acid esters (polyoxyethylene monostearate, polyethylene glycol diisocyanate, and the like), polyoxyethylene alkyl phenyl ethers (polyoxyethylene nonylphenyl ether, polyoxyethylene octylphenyl ether, and the like), and aliphatic diethanol amide-based nonionic surfactants. Further, as a high molecular dispersant, a high molecular compound having a molecular weight of 1000 or more is suitably used. Examples thereof include a styrene-maleic acid resin, a styrene-acryl resin, a rosin, a fluorine-modified polymer, a urethane-based polymer, a polyacrylate-based polymer, an aliphatic diethanol amide-based polymer, a polyester-based polymer, and a polyester polyamide resin.

Moreover, as the dispersant, commercially available products can be used, and specific examples thereof include Surfynol 104, 82, 465, 485, or TG (all manufactured by Air Products and Chemicals, Inc.), Olfine STG and Olfine E1010 (manufactured by Nissin Chemical Industry Co., Ltd.), Nissan Nonion A-10R and A-13R (manufactured by Nippon Oil & Fats Co., Ltd.), Flowlen TG-740 W and D-90 (manufactured by Kyoeisha Chemical Co., Ltd.), Emulgen A-90 and A-60 (manufactured by Kao Corporation), Noigen CX-100 (manufactured by Daiichi Kogyo Seiyaku Co., Ltd.), Hinoact KF1-M, T-6000, T-7000, T-8000, T-8350P, and T-8000EL (manufactured by Takefu Fine Chemical Co., Ltd.), Solsperse 20000, 24000, 32000, 32500, 33500, 34000, and 35200 (manufactured by Avecia Co., Ltd.), BYK-160, 162, 164, 182, 340, and 9077, Disperbyk-161, 162, 163, 164, 166, 180, 190, 191, and 192 (manufactured by BYK-Chemie, Japan K. K.), Flowlen DOPA-17, 22, 33, and G-700 (manufactured by Kyoeisha Chemical Co., Ltd.), Ajispar-PB821 and PB711 (manufactured by Ajinomoto Fine Techno Co., Ltd.), LP-4010, 4050, and 4055, POLYMER 400, 401, 402, 403, 450, 451, and 453, and EFKA-47 and 4300 (manufactured by EFKA Chemicals Co., Ltd.), which may be singular or a mixture of two or more kinds thereof.

The ink can be prepared by well-known common methods. For example, the glitter pigment, a dispersant, and the liquid solvent, as described above, are mixed first, and a pigment dispersion is prepared using a ball mill, a bead mill, ultrasonic waves, a jet mill, or the like, as required. Then, the pigment dispersion is adjusted to have desired ink properties. Subsequently, a binder resin, the liquid solvent, and other additives (for example, a dispersion aid or a viscosity regulator) are then added to the pigment dispersion while stirring to obtain a pigment ink.

In addition to the above method, a composite pigment base material may be once treated with ultrasonic waves in a liquid solvent to obtain a composite pigment dispersion, and then the composite pigment dispersion may be mixed with a required liquid solvent for ink, or a composite pigment base material can be treated with ultrasonic waves directly in a liquid solvent for ink to be used as ink as it is. In order to adjust the solid concentration in ink, known methods such as pressure filtration, centrifugal separation, and the like can also be employed.

Although the physical properties of the ink are not particularly limited, the ink preferably has a surface tension of 20 to 50 mN/m. When the surface tension is less than 20 mN/m, the ink is spread over the surface of a printer head for ink jet recording or bleeds out from the head in some cases. As a result, the discharging of liquid droplets of the ink becomes difficult in some cases. When the surface tension is more than 50 mN/m, the ink is not spread over the surface of a recording medium in some cases, and thus favorable recording cannot be performed in some cases.

By using both of the glitter ink and the resin ink, each including an organic solvent as a main component, an image having high glitter with no blurs can be obtained. The reason is not clear, but it is presumed to be as follows. For example, by using an organic solvent having high compatibility with a resin contained in the underlayer, the organic solvent in the glitter ink is absorbed or the underlayer is dissolved in the glitter ink, and thus, the smoothness of the plate-shaped glitter pigment, that is particularly aligned, is maintained, and further, blurs are inhibited and higher abrasion resistance is secured.

EXAMPLES

1. Preparation of Resin Ink

The resin ink was prepared by adding 20% by mass of a styrene-acrylic acid copolymer (thermoplastic resin particle, average particle diameter 50 nm, molecular weight 55000, glass transition temperature 80° C., acid value 130), 5% by mass of 1,2-hexanediol 2, 4% by mass of 2-pyrrolidone, 0.5% by mass of a silicon-based surfactant (manufactured by BYK-Chemie, Japan K. K., trade name "BYK-348", polyether-modified siloxane), 0.2% by mass of an acetylene glycol-based surfactant (manufactured by Nissin Chemical Industry Co., Ltd.), trade name "Surfynol 104 PG-50"), and a residual amount of ion exchange water, respectively, followed by mixing/stirring at a normal temperature for 1 hour.

2. Preparation of Glitter Ink

In order to obtain a glitter pigment to be added to a glitter ink, first, a glitter pigment dispersion (aluminum pigment dispersion) was prepared as follows.

A resin layer coating liquid containing 3.0% by mass of cellulose acetate butyrate (butylation ratio of 35 to 39%, manufactured by Kanto Chemical Co., Inc.) and 97% by mass of diethylene glycol diethyl ether (manufactured by Nippon Nyukazai Co., Ltd.) was uniformly applied onto a PET film having a film thickness of 100 μm by a bar coating method, and then dried at 60° C. for 10 minutes to form a thin resin layer film on the PET film.

Next, an aluminum vapor-deposition layer having an average film thickness of 20 nm was formed on the above-described resin layer using a vacuum deposition apparatus (VE-1010 type vacuum deposition apparatus manufactured by Vacuum Apparatus Co.).

Next, the laminate formed by the above-described method was simultaneously peeled, pulverized, and dispersed in diethylene glycol diethyl ether using a VS-150 ultrasonic disperser (manufactured by As One Corporation), and a glitter pigment dispersion was prepared by means of an ultrasonic dispersion treatment for 12 cumulative hours.

The aluminum pigment dispersion obtained was filtered with an SUS mesh filter having 5 μm openings to remove the coarse particles. Then, the filtrate was poured into a round bottomed flask and the diethylene glycol diethyl ether was distilled off using a rotary evaporator. Thus, the aluminum pigment dispersion was concentrated, and then the concentration of the aluminum pigment dispersion was adjusted so as to obtain an aluminum pigment dispersion 1 with a concentration of 5% by mass.

Then, using a laser diffraction scattering type particle size distribution measurement apparatus LMS-2000e manufactured by Seishin Enterprise Co., Ltd., the 50% average particle diameter in terms of sphere (d50) of the aluminum pigment was determined by a light scattering method. As a result, it was found to be 1.001 μm.

An aluminum pigment ink was prepared from 1.5% by mass of the aluminum pigment dispersion 1, 64.95% by mass of diethylene glycol diethyl ether (DEGDE), 15% by mass of γ-butyrolactone, 15% by mass of tetraethylene glycol dimethyl ether (TEGDM), 3% by mass of tetraethylene glycol monobutyl ether (TEGMB), 0.35% by mass of cellulose acetate butyrate (CAB, manufactured by Kanto Chemical Co., Inc.; butylation ratio of 35 to 39%), and 0.2% by mass of BYK-UV3500 (trade name, manufactured by BYK-Chemie, Japan K. K.), and then mixed/stirred using a magnetic stirrer for 30 minutes at a normal temperature/normal pressure to make an aluminum pigment ink (glitter ink).

3. Preparation of White Ink

The white ink was prepared from 10% by mass of titanium dioxide (NanoTek®_Slurry: manufactured by C. I. Kasei Co., Ltd.), 2% by mass of a styrene-acrylic acid copolymer, 5% by mass of 1,2-hexanediol, 10% by mass of glycerin, 0.9% by mass of triethanolamine, 0.5% by mass of BYK-348 (manufactured by BYK-Chemie, Japan K. K.), and a residual amount of ion exchange water.

4. Formation of Recorded Matter

Examples 1 to 10

First, the above-described white ink (volume average diameter 330 nm) was recorded on the recording medium shown in Table 1 with a predetermined pattern of a duty of 100%, using PX-G930 (manufactured by Seiko Epson Corporation) as an ink jet printer. Then, a resin ink layer was recorded on the white ink layer at a duty of 100%. Further, the resin ink layer was formed by heating a platen at 50° C. Then, the above-described glitter ink layer was recorded on the resin ink layer with a predetermined pattern of the duty (%) shown in Table 1 to obtain recorded matter. At this time, light was irradiated on the backside of the recorded matter, followed by visual observation. Thus, it was found that the recorded matter had a high hiding power. Also, the "PET" in Table 1 denotes a PET film (manufactured by Lintec Corporation, trade name "PET 50A") and the "Lumirror" denotes Lumirror S10 #100 (manufactured by Toray Co., Ltd.).

Comparative Examples 1 to 10

First, the above-described white ink (volume average diameter 330 nm) was recorded on the recording medium shown in Table 1 with a predetermined pattern of a duty of 100%, using PX-G930 (manufactured by Seiko Epson Corporation) as an ink jet printer. Then, the above-described glitter ink layer was recorded on the white ink layer with a predetermined pattern of the duty (%) shown in Table 1 to obtain recorded matter.

Reference Examples 1 and 2

First, the above-described white ink (volume average diameter 330 nm) was recorded on the recording medium shown in Table 1 with a predetermined pattern of a duty of 100%, using PX-G930 (manufactured by Seiko Epson Corporation) as an ink jet printer.

Examples 11 to 20

First, the above-described white ink (volume average diameter 280 nm) was recorded on the recording medium shown in Table 2 with a predetermined pattern of a duty of 100%, using PX-G930 (manufactured by Seiko Epson Corporation) as an ink jet printer. Then, a resin ink layer was recorded on the white ink layer at a duty of 100%. At this time, light was irradiated on the backside of the recorded matter, followed by visual observation. Thus, it was found that the recorded matter had a high hiding power. Further, the resin ink layer was formed by heating a platen at 50° C. Then, the above-described glitter ink layer was recorded on the resin ink layer with a predetermined pattern of the duty (%) shown in Table 2 to obtain recorded matter.

Comparative Examples 11 to 20

First, the above-described white ink (volume average diameter 280 nm) was recorded on the recording medium shown in Table 2 with a predetermined pattern of a duty of 100%, using PX-G930 (manufactured by Seiko Epson Corporation) as an ink jet printer. Then, the above-described glitter ink layer was recorded on the white ink layer with a predetermined pattern of the duty (%) shown in Table 2 to obtain recorded matter.

Reference Examples 3 and 4

First, the above-described white ink (volume average diameter 280 nm) was recorded on the recording medium shown in Table 2 with a predetermined pattern of a duty of 100%, using PX-G930 (manufactured by Seiko Epson Corporation) as an ink jet printer.

TABLE 1

| | Glitter ink Duty | Type of recording medium | Glossy at 60° | Evaluation of gloss |
|---|---|---|---|---|
| Example 1 | 100% | PET | 284 | B |
| Example 2 | 90% | PET | 318 | A |
| Example 3 | 80% | PET | 315 | A |
| Example 4 | 70% | PET | 274 | B |
| Example 5 | 60% | PET | 248 | B |
| Example 6 | 100% | Lumirror | 306 | A |
| Example 7 | 90% | Lumirror | 348 | A |
| Example 8 | 80% | Lumirror | 338 | A |
| Example 9 | 70% | Lumirror | 293 | B |
| Example 10 | 60% | Lumirror | 261 | B |
| Comparative Example 1 | 100% | PET | 68.8 | D |
| Comparative Example 2 | 90% | PET | 78 | D |
| Comparative Example 3 | 80% | PET | 81.3 | D |
| Comparative Example 4 | 70% | PET | 94.5 | D |
| Comparative Example 5 | 60% | PET | 114 | C |
| Comparative Example 6 | 100% | Lumirror | 66.3 | D |
| Comparative Example 7 | 90% | Lumirror | 77.5 | D |
| Comparative Example 8 | 80% | Lumirror | 98.5 | D |
| Comparative Example 9 | 70% | Lumirror | 129 | C |
| Comparative Example 10 | 60% | Lumirror | 168 | C |
| Reference Example 1 | 0% | PET | 74.3 | D |
| Reference Example 2 | 0% | Lumirror | 80.5 | D |

TABLE 2

| | Glitter ink Duty | Type of recording medium | Glossy at 60° | Evaluation of gloss |
|---|---|---|---|---|
| Example 11 | 100% | PET | 331 | A |
| Example 12 | 90% | PET | 342 | A |
| Example 13 | 80% | PET | 346 | A |
| Example 14 | 70% | PET | 298 | A |

TABLE 2-continued

|  | Glitter ink Duty | Type of recording medium | Glossy at 60° | Evaluation of gloss |
|---|---|---|---|---|
| Example 15 | 60% | PET | 277 | B |
| Example 16 | 100% | Lumirror | 345 | A |
| Example 17 | 90% | Lumirror | 388 | A |
| Example 18 | 80% | Lumirror | 366 | A |
| Example 19 | 70% | Lumirror | 326 | A |
| Example 20 | 60% | Lumirror | 311 | A |
| Comparative Example 11 | 100% | PET | 75.6 | D |
| Comparative Example 12 | 90% | PET | 88.1 | D |
| Comparative Example 13 | 80% | PET | 87.3 | D |
| Comparative Example 14 | 70% | PET | 112.5 | C |
| Comparative Example 15 | 60% | PET | 114.3 | C |
| Comparative Example 16 | 100% | Lumirror | 81.3 | D |
| Comparative Example 17 | 90% | Lumirror | 90.5 | D |
| Comparative Example 18 | 80% | Lumirror | 109.4 | C |
| Comparative Example 19 | 70% | Lumirror | 129.5 | C |
| Comparative Example 20 | 60% | Lumirror | 165.2 | C |
| Reference Example 3 | 0% | PET | 91.3 | D |
| Reference Example 4 | 0% | Lumirror | 97.5 | D |

5. Evaluation

5.1. Glossy

On the recording surface of the recorded matter according to each of Examples, Comparative Examples, and Reference Examples above, the glossy was measured at a swing angle of 60° using a glossmeter (MINOLTA MULTI GLOSS 268) and evaluated in accordance with the following criteria.

(1) Glitter Ink
A: Glossy is 300 or more.
B: Glossy is 200 or more and less than 300.
C: Glossy is 100 or more and less than 200.
D: Glossy is less than 100.

5.2. Results

As is clear from Tables 1 and 2, with the recorded matter obtained according to the ink jet recording method of an aspect of the invention, a white ink layer was formed at a duty of 100% and with a high hiding degree as well as excellent glitter. On the other hand, in Comparative Examples, the layer had a high hiding property but its glitter was low, and satisfactory results could not be obtained.

What is claimed is:

1. An ink jet recording method comprising:
    firstly forming a white ink layer on a recording medium by ejecting an aqueous white ink containing a white color material from a printer head, secondly forming a resin ink layer on the white ink layer by ejecting a transparent aqueous resin ink containing a thermoplastic resin from the printer head, drying the resin ink layer by heating, and thirdly forming a glitter ink layer on the resin ink layer by ejecting a glitter ink containing a glitter pigment from the printer head,
    wherein a surface roughness of a surface of the resin ink layer is 20 µm or less,
    wherein a refractive index of the thermoplastic resin included in the resin ink is in the range of 1.4 to 1.6, and
    wherein the gloss measured at 60° of the resin ink layer is 20 or more.

2. The ink jet recording method as described in claim 1, wherein a volume average diameter (Mv) of the white ink is 100 nm to 700 nm.

3. The ink jet recording method as described in claim 1, wherein the recording medium is a transparent recording medium.

4. The ink jet recording method as described in claim 1, wherein the white color material is titanium dioxide and a volume average diameter (Mv) of the titanium dioxide is 280 to 440 nm.

5. Recorded matter recorded by the ink jet recording method as described in claim 1.

6. Recorded matter recorded by the ink jet recording method as described in claim 2.

7. Recorded matter recorded by the ink jet recording method as described in claim 3.

8. Recorded matter recorded by the ink jet recording method as described in claim 4.

* * * * *